United States Patent
Lee et al.

(10) Patent No.: US 10,377,415 B2
(45) Date of Patent: Aug. 13, 2019

(54) METHOD OF CONTROLLING MOTOR DRIVEN POWER STEERING SYSTEM

(71) Applicant: HYUNDAI MOTOR COMPANY, Seoul (KR)

(72) Inventors: Jong Ho Lee, Incheon (KR); Min Woo Han, Hwaseong-si (KR); Jin Hyuck Heo, Seoul (KR); Woo Je Sung, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 99 days.

(21) Appl. No.: 15/376,530

(22) Filed: Dec. 12, 2016

(65) Prior Publication Data

US 2018/0105204 A1   Apr. 19, 2018

(30) Foreign Application Priority Data

Oct. 19, 2016 (KR) .................. 10-2016-0135465

(51) Int. Cl.
*B62D 6/00* (2006.01)
*B62D 5/04* (2006.01)
*B62D 6/10* (2006.01)
*B62D 15/02* (2006.01)

(52) U.S. Cl.
CPC .............. *B62D 6/00* (2013.01); *B62D 5/049* (2013.01); *B62D 5/0484* (2013.01); *B62D 6/10* (2013.01); *B62D 15/021* (2013.01)

(58) Field of Classification Search
CPC .......... B62D 6/00; B62D 15/021; B62D 5/04; B62D 5/0463; B62D 5/0484; B62D 5/049
See application file for complete search history.

(56) References Cited

U.S. PATENT DOCUMENTS

| | | | |
|---|---|---|---|
| 6,170,600 B1 * | 1/2001 | Shimizu | ................... B62D 1/28 |
| | | | 180/446 |
| 7,444,217 B2 | 10/2008 | Matsuoka | |
| 9,266,559 B2 | 2/2016 | Morishita et al. | |
| 2007/0029129 A1 * | 2/2007 | Shiozawa | ............ B62D 5/0472 |
| | | | 180/446 |

(Continued)

FOREIGN PATENT DOCUMENTS

| | | |
|---|---|---|
| JP | 2004-114755 A | 4/2004 |
| JP | 2005-219573 A | 8/2005 |

(Continued)

*Primary Examiner* — Thomas E Worden
(74) *Attorney, Agent, or Firm* — Knobbe Martens Olson & Bear LLP

(57) ABSTRACT

Disclosed is a method of controlling a motor driven power steering system (MDPS). The method includes multiple operations including a torque sensor failure determining operation of determining failure of the torque sensor according to existence of a torque sensor signal input from the torque sensor; a control module calculating operation of, when it is determined that the torque has failure, receiving control signals from a steering angle sensor and a motor angle sensor and calculating a plurality of control modules including a basic assist generating module, an assist maintaining module, and an overshoot preventing module; and an MDPS motor driving operation of driving a motor of the MDPS based on motor torque calculated through the control module.

5 Claims, 3 Drawing Sheets

(56) References Cited

U.S. PATENT DOCUMENTS

| | | | |
|---|---|---|---|
| 2008/0078608 A1* | 4/2008 | Hara | B62D 5/0484 |
| | | | 180/446 |
| 2010/0030427 A1* | 2/2010 | Mitsuhara | B62D 15/0215 |
| | | | 701/41 |
| 2010/0299027 A1* | 11/2010 | Aoki | B62D 5/0463 |
| | | | 701/42 |
| 2013/0261894 A1* | 10/2013 | Kojima | B62D 5/0463 |
| | | | 701/41 |
| 2015/0151783 A1* | 6/2015 | Kitazume | B62D 5/0472 |
| | | | 701/42 |
| 2015/0375776 A1* | 12/2015 | Hong | B62D 5/0463 |
| | | | 701/43 |
| 2016/0101809 A1* | 4/2016 | Hong | B62D 5/0484 |
| | | | 701/43 |
| 2017/0015348 A1* | 1/2017 | Sasaki | B62D 5/0484 |
| 2017/0203785 A1* | 7/2017 | Naik | B62D 5/0484 |
| 2018/0086368 A1* | 3/2018 | Patel | B62D 5/0484 |

FOREIGN PATENT DOCUMENTS

| | | |
|---|---|---|
| JP | 2006-248250 A | 9/2006 |
| JP | 2009-51292 A | 3/2009 |
| JP | 2013-147175 A | 8/2013 |
| KR | 10-2014-0086069 A | 7/2014 |
| KR | 10-2014-0139816 A | 12/2014 |
| KR | 10-2016-0041350 A | 4/2016 |
| KR | 10-2016-0043244 A | 4/2016 |

\* cited by examiner

METHOD OF CONTROLLING MOTOR DRIVEN POWER STEERING SYSTEM

CROSS-REFERENCE TO RELATED APPLICATION

This application claims under 35 U.S.C. § 119(a) the benefit of Korean Patent Application No. 10-2016-0135465 filed on Oct. 19, 2016, the entire contents of which are incorporated herein by reference.

BACKGROUND

(a) Field

The present disclosure relates to a method of controlling a motor driven power steering system. More particularly, it relates to a method of controlling a motor driven power steering system, which generates an auxiliary assist by using a steering angle sensor signal and a motor angle sensor signal when a torque sensor has failure and performs a control by replacing a motor torque signal through the generated auxiliary assist.

(b) Background

In general, a hydraulic power steering system (HPS), which assists steering power of a driver by using hydraulic pressure formed by a hydraulic pump, and a motor driven power steering system (MDPS), which assists steering power of a driver by using driving torque of an electric motor, are known as the power assistant steering systems for decreasing steering power of a driver when an automobile steers.

When the MDPS performs a steering assisting function according to an operation of a steering wheel by a driver, an output of an electric motor for assisting steering may be controlled according to a travelling condition of a vehicle, so that the MDPS provides more improved steering performance and a sense of steering compared to those of the HPS.

In this case, the MDPS, which is capable of changing and controlling steering assisting power generated by an output of a motor according to a travelling condition, has been widely applied to the recently released vehicles.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to solve the above-described issues, and provide a method of controlling a motor driven power steering system, which generates an auxiliary assist by using a steering angle sensor signal and a motor angle sensor signal when the torque sensor has failure, and performs controls by replacing a motor torque signal of the torque sensor through the auxiliary assist, thereby preventing the sense of locking a steering wheel due to the failure of the torque sensor.

A motor driven power steering system (MDPS) may include a steering angle sensor detecting a steering angle (column input angle) according to an operation of a steering wheel, a torque sensor detecting steering torque (steering wheel torque and column torque) input through the steering wheel, a vehicle speed sensor detecting a speed of a vehicle, sensors, such as a wheel speed sensor, an rpm sensor, and a yaw rate sensor, a control unit (MDPS ECU), and a steering motor (MDPS motor).

In the configuration, the control unit receives steering input information, such as a steering angle, a steering angular speed (an angular speed value obtained from a differentiation signal of a steering angle signal), and steering torque, and vehicle state information (a vehicle speed, a wheel speed, an rpm of an engine, a yaw rate, and the like) from the sensors in order to control driving and an output of the steering motor.

In the meantime, when the torque sensor has failure, the MDPS interrupts an operation of the control unit in order to prevent an erroneous control, and in this case, the steering wheel of the driver is locked, so that the driver may be exposed to a dangerous situation while driving.

Accordingly, when an auxiliary assist is generated by using a steering angle sensor signal and a motor angle sensor signal when the torque sensor of the MDPS has failure and a torque signal is replaced through the generated auxiliary assist, it is possible to provide a driver with an emergency steering function, thereby solving the aforementioned problem.

In one aspect, the present invention provides a method of controlling a motor driven power steering system (MDPS), including: a torque sensor failure determining operation of determining failure of the torque sensor according to existence of a torque sensor signal input from the torque sensor; a control module calculating operation of, when it is determined that that the torque sensor has the failure, receiving control signals from a steering angle sensor and a motor angle sensor and calculating a plurality of control modules including a basic assist generating module, an assist maintaining module, and an overshoot preventing module; and an MDPS motor driving operation of driving a motor of the MDPS based on motor torque calculated through the control modules.

In an embodiment, the control module calculating operation may include simulating a plurality of control logics executed in the torque sensor through the plurality of control modules.

In embodiments, the motor torque may be calculated by adding/subtracting an assist maintenance output value calculated by the assist maintaining module and an overshoot preventing output value calculated by the overshoot preventing module to/from a motor output value calculated by the basic assist generating module.

In embodiments, the basic assist generating module may receive a steering angle sensor signal from the steering angle sensor and a motor angular speed sensor signal from the motor angle sensor, and calculate the motor output value.

In embodiments, the motor output value may be calculated by multiplying an integral value of a difference between a steering angular speed output value and a value obtained by multiplying a reduction gear ratio and a motor angular speed by a predetermined hardness value of a torsion bar, and may be finally calculated by reflecting a predetermined first tuning value.

In embodiments, the assist maintaining module may receive any one of a steering angle signal, a lateral acceleration signal, and a yaw rate signal from the steering angle sensor, and calculate the assist maintaining output value, and the assist maintaining output value may be calculated by multiplying a steering angle output value by a predetermined second tuning value.

In embodiments, the overshoot preventing module may receive a steering angular speed signal from the steering angle sensor and calculate the overshoot preventing output value, and the overshoot preventing output value may be calculated by multiplying a steering angular speed output value by a predetermined third tuning value.

According to embodiments of the present invention, when a torque sensor has failure, an auxiliary assist is generated by using a steering angle sensor signal and a motor angle sensor signal, and a control is performed by replacing a motor torque signal of the torque sensor through the auxiliary assist, thereby preventing the sense of locking a steering wheel due to the failure of the torque sensor.

According to embodiments of the present invention, it is possible to utilize a calculation and a sensor signal of a controller of the existing MDPS, so that it is possible to treat failure of a torque sensor without a separate increase in costs, thereby removing complaints of a driver.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to embodiments thereof illustrated in the accompanying drawings which are given herein below by way of illustration only, and thus are not limitative of the present invention, and wherein.

Figure 1:
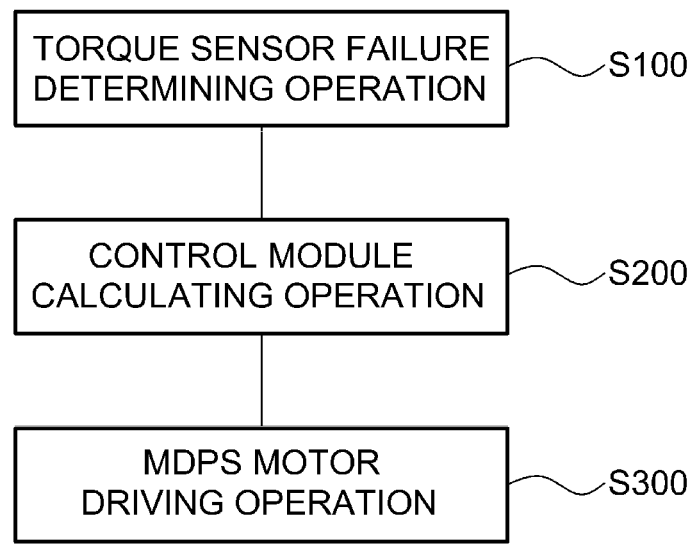
FIG. 1 is a flowchart sequentially illustrating a method of controlling a motor driven power steering system according to an embodiment of the present invention.

It should be understood that the appended drawings are not necessarily to scale, presenting a somewhat simplified representation of various features of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with embodiments, it will be understood that present description is not intended to limit the invention to embodiments. On the contrary, the invention is intended to cover not only the embodiments described below, but also various alternatives, modifications, equivalents and other embodiments, which may be included within the spirit and scope of the invention as defined by the appended claims.

An aspect of the present invention provides a computerized controller of a motor driven power steering (MDPS) system. The computerized controller generates control signals or commands for a motor of MDPS in response to the driver's input via a steering wheel of the vehicle. In embodiments, the controller generates control signals or commands using signals from at least one of a torque sensor for measuring steering torque of the steering wheel 210, a steering angle sensor for measuring angle of the steering wheel 220, and a motor angle sensor 230 for measuring an angular position of the rotor of the motor of the MDPS.

In embodiments, the computerized controller uses different control mechanisms according to availability of signals from the torque sensor. In embodiments, when the signals 210 from torque sensor (torque sensor signals) are available or no abnormality is identified about the torque sensor (240 in FIG. 2), the controller generates control commands 250 for the motor of the MDPS using the torque sensor signals 210 and the steering angle sensor signals 220 but not using motor angle sensor signals representing angular position of the rotor of the motor.

In embodiments, when torque sensor signals are not available or an abnormality is detected about the torque sensor or its signals (260 in FIG. 2), the controller generates control commands 270 for the motor of the MDPS using the motor angle sensor signals 230 in addition to the steering angle sensor signals 220 while not using signals from the torque sensor 210.

Hereinafter, an embodiment according to embodiments of the present invention will be described in detail with reference to the accompanying drawings.

Advantages and features of the present invention and methods of achieving the advantages and features will be clear with reference to embodiments described in detail below together with the accompanying drawings.

However, the present invention is not limited to embodiments to be disclosed below, but various forms different from each other may be implemented.

Figure 2:
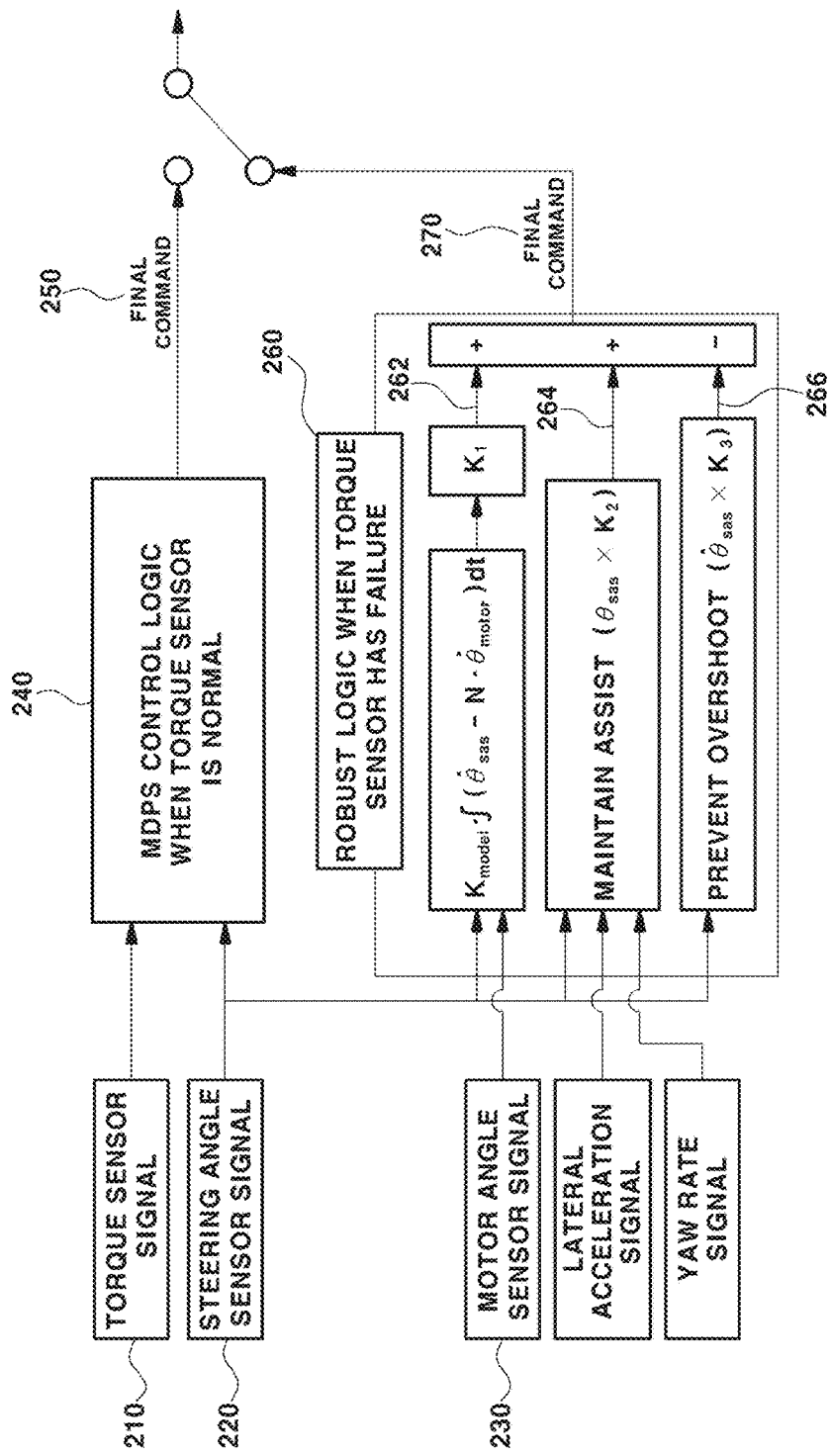
FIG. 2 is a diagram illustrating a control flow of the method of controlling a motor driven power steering system according to an embodiment of the present invention.
Figure 3:
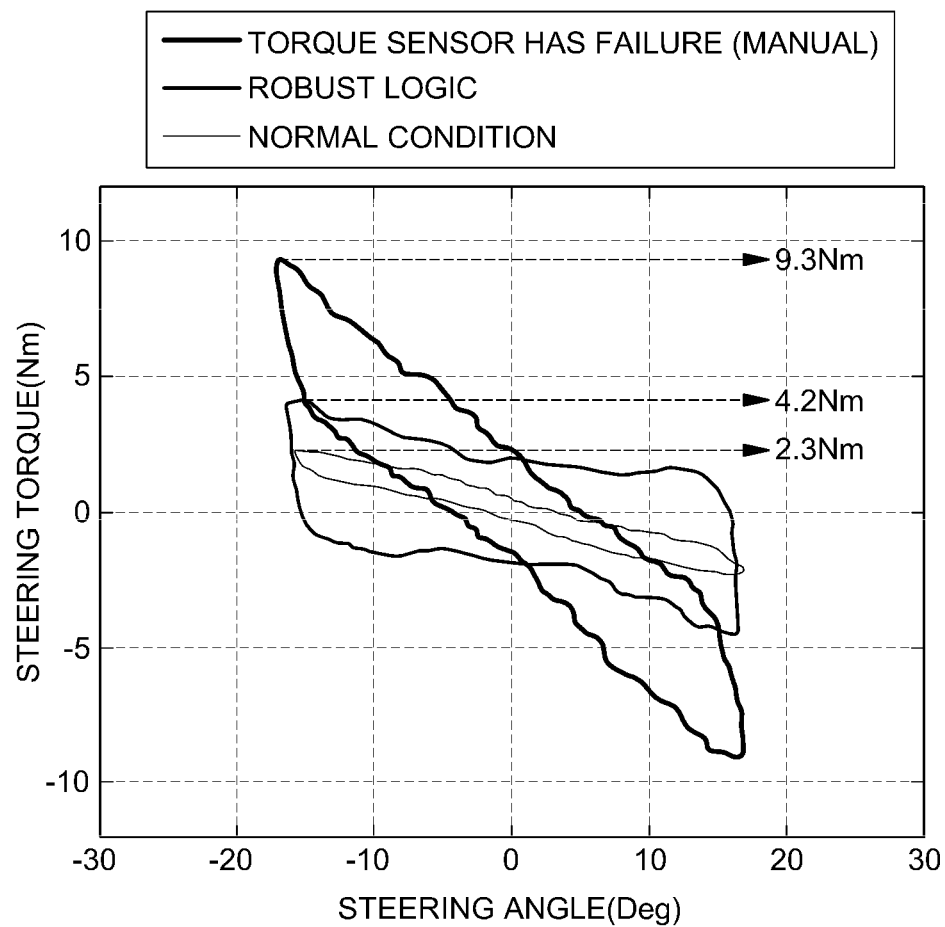
FIG. 3 is a graph illustrating a result of emergency steering through the method of controlling a motor driven power steering system according to an embodiment of the present invention.

FIG. 1 is a flowchart sequentially illustrating a method of controlling a motor driven power steering system according to an embodiment of the present invention, FIG. 2 is a diagram illustrating a control flow of the method of controlling a motor driven power steering system according to an embodiment of the present invention, and FIG. 3 is a graph illustrating a result of emergency steering through the method of controlling a motor driven power steering system according to an embodiment of the present invention.

As illustrated in FIG. 1, a method of controlling a motor driven power steering system (MDPS) when a torque sensor of the MDPS has failure will be sequentially described below.

First, it is determined whether a torque sensor has failure according to existence of a torque sensor signal input from the torque sensor (S100).

That is, the MDPS is a control system which determines a steering intention of a driver based on the torque sensor signal, and assists the steering according to the determined steering intention of the driver, and when the torque sensor signal is not properly transmitted, so that it is determined that the torque sensor has the failure, the control of the MDPS is interrupted in order to prevent the MDPS from being erroneously controlled, which may cause a sense of locking of a steering wheel to the driver while driving.

Accordingly, in order to solve the aforementioned problem, when it is determined that the torque sensor has the failure (S100), an emergency steering control, which is capable of simulating a control logic executed through the torque sensor, is performed, thereby effectively securing safety and removing complaints of the driver.

To this end, as described above, when it is determined that the torque sensor has failure (S100), the MDPS receives control signals from a pre-installed steering angle sensor and motor angle sensor, and calculates a plurality of control modules including a basic assist generating module, an assist maintaining module, and an overshoot preventing module (S200).

This is for the purpose of simulating the control logic, which performs an assist control, a damping control, a restoration control, and the like through the torque sensor signal and the steering angle sensor signal as illustrated in FIG. 2 through the calculation of the plurality of control modules, and when the torque sensor has failure, a predetermined robust logic is executed by using the steering angle sensor and the motor angle sensor.

Accordingly, in embodiments, a motor of the MDPS is driven based on motor torque calculated through the plurality of control modules (S300), so that the emergency steering control may be executed, and as a result, it is possible to prevent the sense of locking the steering wheel when the torque sensor has failure.

Here, the motor torque 270 for driving the motor of the MDPS may be calculated by adding/subtracting an assist maintenance output value 264 calculated by the assist maintaining module and an overshoot preventing output value 266 calculated by the overshoot preventing module to/from a motor output value 262 calculated by the basic assist generating module as illustrated in FIG. 2.

In this case, the basic assist generating module among the plurality of control modules calculating the motor torque receives the steering angle sensor signal from the steering angle sensor and a motor angular speed sensor signal from the motor angle sensor, and calculates the motor output value.

That is, the motor output value is calculated by multiplying an integral value of a difference between the steering angular speed output value and a value obtained by multiplying a reduction gear ratio and a motor angular speed by a predetermined hardness value of a torsion bar, and more particularly, the motor output value 262 is calculated by Equation 1 below.

$$K_{model} \int (\theta'_{sas} - N \cdot \theta'_{motor}) dt \qquad \text{<Equation 1>}$$

Herein, Equation 1 calculates a motor output value for a basic assistance by using a speed difference between a steering angle and a motor rotation angle, and $K_{model}$ means a predetermined hardness value of a torsion bar, $\theta'_{sas}$ means a steering angular speed, and $\theta'_{motor}$ means a motor angular speed, which are for the purpose of simulating driver's torque generally output through the torque sensor.

That is, driver's torque T generally output through the torque sensor is calculated by Equation 2, $$T = K^*(\theta_1 - \theta_2) \qquad \text{<Equation 2>}$$

here, K means a predetermined hardness value of the torsion bar, $\theta_1$ means an angle of an upper end of the torsion bar, $\theta_2$ means an angle of a lower end of the torsion bar, and as a result, $\theta_1 - \theta_2$ means the quantity of distortion of the torsion bar, and when the torque sensor has failure, it is impossible to calculate the aforementioned driver's torque. Accordingly, in embodiments, it is possible to calculate the motor output value for the basic assistance by using the steering angle sensor signal and the motor angle sensor signal through Equation 1 simulating Equation 2 by using the steering angular speed and the motor angular speed when the torque sensor has failure.

In Equation 1, N means a value for a reduction gear ratio, and more particularly, N is for the purpose of simulating a reducer, which increases power while decreasing the number of revolutions per minute of the motor, installed in the MDPS.

The value of the driver's torque calculated by Equation 1 needs to reflect a first tuning value for calculating a final motor output value, and the first tuning value is a weighting factor for controlling an output value for each vehicle speed.

In the meantime, the assist maintaining module among the plurality of control modules calculating the motor torque receives any one of the steering angular signal, a lateral acceleration signal, and a yaw rate signal from the steering angle sensor and calculates an assist maintaining output value, and the assist maintaining output value 264 may be calculated by multiplying a steering angle output value by a predetermined second tuning value.

This generates assist maintaining power based on a steering angle, a lateral acceleration, or a yaw rate according to the vehicle speed when the vehicle travels a curve, and all of the three signals generate the similar output values for predicting a behavior when the vehicle travels a curve, and thus if any one of the three signals is used, the same output value may be calculated.

Accordingly, it is possible to perform a maintenance assist control when the vehicle travels the curve by applying the second tuning value, that is, the weighting factor for each vehicle speed, to the steering angle signal, the lateral angular speed signal, or the yaw rate signal.

In the meantime, the overshoot preventing module among the plurality of control modules calculating the motor torque receives the steering angular speed signal from the steering angle sensor and calculates an overshoot preventing output value, and the overshoot preventing output value 266 may be calculated by multiplying the steering angular speed output value by a predetermined third turning value.

That is, the overshoot preventing output value may generate overshoot preventing power during the rapid steering by multiplying the steering angular speed by the predetermined third tuning value, that is, may serve to prevent an overshoot by determining the rapid steering state based on the steering angular speed.

Accordingly, the overshoot preventing module enables the control to be performed based on a vehicle speed corresponding to the predetermined third tuning value and the steering angular speed.

As a result, in embodiments, it is possible to configure the control module including the basic assist generating module, the assist maintaining module, and the overshoot preventing module by using a total of six signals corresponding to a steering angle, a steering angular speed, a motor angular speed, a vehicle speed, a lateral acceleration, and a yaw rate, and when the torque sensor has failure, the emergency steering is performed by driving the motor of the MDPS based on the motor torque calculated through the control modules, thereby preventing the sense of locking the steering wheel according to the failure of the torque sensor.

In embodiments, motor torque for the emergency steering is generated by using the six signals (a steering angle, a steering angular speed, a motor angular speed, a vehicle speed, a lateral acceleration, and a yaw rate) generally used for controlling the MDPS, such that steering power similar to steering power under a normal condition may be generated as illustrated in FIG. 3 even without separate costs when the torque sensor has failure.

According to embodiments of the present invention, when a torque sensor has failure, an auxiliary assist is generated by using a steering angle sensor signal and a motor angle sensor signal, and a control is performed by replacing a motor torque signal of the torque sensor through the auxiliary assist, thereby preventing the sense of locking a steering wheel due to the failure of the torque sensor.

According to embodiments of the present invention, it is possible to utilize a calculation and a sensor signal of a controller of the existing MDPS, and thus it is possible to treat failure of a torque sensor without a separate increase in costs, thereby removing complaints of a driver.

Features of the invention have been described in detail with reference to embodiments thereof. However, it will be appreciated by those skilled in the art that changes may be made in these embodiments.

What is claimed is:

1. A method of controlling a motor driven power steering system (MDPS), comprising:
    determining failure of a torque sensor according to existence of a torque sensor signal input from the torque sensor;
    when it is determined that the torque sensor has failure, receiving signals from a steering angle sensor and a motor angle sensor and calculating one or more values relevant to a motor torque command based on computations done by controllers; and
    driving a motor of the MDPS based on the one or more values relevant to the motor torque command calculated by the controllers,
    wherein the one or more values relevant to the motor torque command comprise a motor output value,
    wherein the controllers receive a steering angle sensor signal from the steering angle sensor and a motor angular speed sensor signal from the motor angle sensor, and calculate the motor output value,
    wherein the motor output value is calculated by multiplying an integral value of a difference between a steering angular speed output value and a value obtained by multiplying a reduction gear ratio and a motor angular speed by a predetermined hardness value of a torsion bar, and then multiplying that result by a predetermined first tuning value,
    wherein the one or more values relevant to the motor torque command further comprise an assist maintaining output value that is to be added to or subtracted from the motor output value,
    wherein the controllers receive the steering angle sensor signal, a lateral acceleration signal, and a yaw rate signal, and calculate the assist maintaining output value based on the steering angle sensor signal, the lateral acceleration signal, and the yaw rate signal,
    wherein the assist maintaining output value is calculated further based on a predetermined second tuning value that is a weighting factor for a vehicle speed and to be applied to the steering angle sensor signal, the lateral acceleration signal, or the yaw rate signal.

2. The method of claim 1, wherein determining includes simulating a plurality of control logics executed in the torque sensor through the controllers.

3. The method of claim 1, wherein the one or more values relevant to the motor torque command further comprise an overshoot preventing output value that is to be added to or subtracted from the motor output value.

4. The method of claim 3, wherein the controllers receive a steering angular speed signal from the steering angle sensor and calculate the overshoot preventing output value, and wherein the overshoot preventing output value is calculated by multiplying the steering angular speed output value by a predetermined third tuning value.

5. A method of controlling a motor driven power steering system (MDPS), comprising:
    determining failure of a torque sensor according to existence of a torque sensor signal input from the torque sensor;
    when it is determined that the torque sensor has failure, receiving signals from a steering angle sensor and a motor angle sensor and calculating one or more values relevant to a motor torque command based on computations done by one or more controllers; and
    driving a motor of the MDPS based on the one or more values relevant to the motor torque command calculated by the one or more controllers,
    wherein the one or more values relevant to the motor torque command comprise a motor output value,
    wherein the one or more controllers receive a steering angular speed signal from the steering angle sensor and a motor angular speed signal from the motor angle sensor, and calculate the motor output value,
    wherein the motor output value is calculated by Equation 1 below, $$K_{model} \int (\theta'_{sas} - N \cdot \theta'_{motor}) dt \qquad \text{<Equation 1>}$$

wherein $K_{model}$ is a predetermined hardness value of a torsion bar, $\theta'_{sas}$ is a steering angular speed, N is a value indicative of a reduction gear ratio, and $\theta'_{motor}$ is a motor angular speed,
    wherein the one or more values relevant to the motor torque command further comprise an assist maintaining output value that is to be added to or subtracted from the motor output value,
    wherein the one or more controllers receive the steering angle sensor signal, a lateral acceleration signal, and a yaw rate signal, and calculate the assist maintaining output value based on the steering angle sensor signal, the lateral acceleration signal, and the yaw rate signal,
    wherein the assist maintaining output value is calculated further based on a predetermined tuning value that is a weighting factor for a vehicle speed and to be applied to the steering angle sensor signal, the lateral acceleration signal, or the yaw rate signal.

* * * * *